(12) United States Patent
Marsters et al.

(10) Patent No.: US 9,980,442 B2
(45) Date of Patent: May 29, 2018

(54) METHOD AND APPARATUS FOR PROGRAMMING A DECODER-BASED IRRIGATION CONTROLLER

(71) Applicant: Rain Bird Corporation, Azusa, CA (US)

(72) Inventors: Jonathan I. Marsters, San Diego, CA (US); Harvey J. Nickerson, El Cajon, CA (US); Sundarraj Karthikeyan, San Diego, CA (US); Douglas H. Callison, Winchester, CA (US); Steven A. Hollington, Oro Valley, AZ (US); Darin K. Price, San Diego, CA (US)

(73) Assignee: Rain Bird Corporation, Azusa, CA (US)

( * ) Notice: Subject to any disclaimer, the term of this patent is extended or adjusted under 35 U.S.C. 154(b) by 771 days.

(21) Appl. No.: 14/521,277

(22) Filed: Oct. 22, 2014

(65) Prior Publication Data

US 2015/0045973 A1    Feb. 12, 2015

Related U.S. Application Data

(63) Continuation of application No. 12/837,381, filed on Jul. 15, 2010, now Pat. No. 8,897,899.

(51) Int. Cl.
*A01G 25/16* (2006.01)
*G05B 19/042* (2006.01)
*G05B 15/02* (2006.01)

(52) U.S. Cl.
CPC ............. *A01G 25/16* (2013.01); *G05B 15/02* (2013.01); *G05B 19/0426* (2013.01); *G05B 2219/23273* (2013.01); *G05B 2219/23276* (2013.01)

(58) Field of Classification Search
CPC ...................................................... A01G 25/16
See application file for complete search history.

(56) References Cited

U.S. PATENT DOCUMENTS

| 4,723,714 A | 2/1988 | Lucas |
| 6,431,475 B1 * | 8/2002 | Williams ............... A01G 25/09 239/740 |
| 7,058,479 B2 | 6/2006 | Miller |
| (Continued) | | |

OTHER PUBLICATIONS

Rain Bird; "Rain Bird Controller Unit MDC2", published at www.rainbird.com/pdf/turf/man_MDC2_en.pdf; Mar. 2008; pp. 1-118, Rain Bird Corporation; Azusa, CA.

(Continued)

*Primary Examiner* — Tejal Gami
(74) *Attorney, Agent, or Firm* — Fitch, Even, Tabin & Flannery LLP

(57) ABSTRACT

A method and decoder-based irrigation controller, and method and programming chart, are provided. In some embodiments, a decoder-based irrigation controller comprises a microcontroller; and a first connector coupled to the microcontroller and configured to couple to a reader, wherein the reader comprises an optical reader configured to read an optically readable pattern, wherein the first connector is further configured to couple an input from the reader to the microcontroller; and wherein the microcontroller is configured to interpret the input from the reader and perform an action at the decoder-based irrigation controller according to the input.

20 Claims, 14 Drawing Sheets

(56) References Cited

U.S. PATENT DOCUMENTS

| | | | |
|---|---|---|---|
| 7,143,641 | B2 | 12/2006 | Palazzolo |
| 7,172,366 | B1 | 2/2007 | Bishop, Jr. |
| 8,897,899 | B2 | 11/2014 | Marsters |
| 2003/0009254 | A1 | 1/2003 | Carlson |
| 2004/0222325 | A1 | 11/2004 | Regev |
| 2005/0171646 | A1* | 8/2005 | Miller .................. A01G 25/16 700/284 |
| 2005/0267641 | A1 | 12/2005 | Nickerson |
| 2009/0100132 | A1 | 4/2009 | Ebrom |
| 2009/0314862 | A1* | 12/2009 | Bauman .............. A01G 25/097 239/743 |
| 2010/0256827 | A1* | 10/2010 | Bragg ................. A01G 25/165 700/284 |
| 2012/0016497 | A1 | 1/2012 | Marsters |

OTHER PUBLICATIONS

USPTO; U.S. Appl. No. 12/837,381 ; Applicant-Initiated Interview Summary dated Sep. 4, 2013.
USPTO; U.S. Appl. No. 12/837,381; Final Office Action dated May 13, 2013.
USPTO; U.S. Appl. No. 12/837,381; Notice of Allowance dated Jul. 24, 2014.
USPTO; U.S. Appl. No. 12/837,381; Office Action dated Mar. 27, 2014.
USPTO; U.S. Appl. No. 12/837,381; Office Action dated Oct. 16, 2012.
USPTO; U.S. Appl. No. 12/837,381; Restriction Requirement dated Aug. 20, 2012.

* cited by examiner

| Monthly Seasonal Adjust % | |
|---|---|
| JAN | % |
| FEB | % |
| MAR | % |
| APR | % |
| MAY | % |
| JUN | % |
| JUL | % |
| AUG | % |
| SEP | % |
| OCT | % |
| NOV | % |
| DEC | % |
| Default Values for Monthly Seasonal Adjust = 100% | |

| Program Info | | Program A | Program B | Program C | Program D |
|---|---|---|---|---|---|
| Program Name | | | | | |
| Select Days To Water (Mon-Sun) For Custom -OR- Select Days Watering Allowed For Non-custom | | M T W T F S S ☐☐☐☐☐☐☐ ☐ ___ Day Cycle ☐ Even ☐ Odd ☐ Odd 31 | M T W T F S S ☐☐☐☐☐☐☐ ☐ ___ Day Cycle ☐ Even ☐ Odd ☐ Odd 31 | M T W T F S S ☐☐☐☐☐☐☐ ☐ ___ Day Cycle ☐ Even ☐ Odd ☐ Odd 31 | M T W T F S S ☐☐☐☐☐☐☐ ☐ ___ Day Cycle ☐ Even ☐ Odd ☐ Odd 31 |
| Set Watering Start Times | 1 | am/pm | am/pm | am/pm | am/pm |
| | 2 | am/pm | am/pm | am/pm | am/pm |
| | 3 | am/pm | am/pm | am/pm | am/pm |
| | 4 | am/pm | am/pm | am/pm | am/pm |
| | 5 | am/pm | am/pm | am/pm | am/pm |
| | 6 | am/pm | am/pm | am/pm | am/pm |
| | 7 | am/pm | am/pm | am/pm | am/pm |
| | 8 | am/pm | am/pm | am/pm | am/pm |
| Seasonal Adjust | | % | % | % | % |
| Monthly Seasonal Adjust | | ☐ ON | ☐ ON | ☐ ON | ☐ ON |
| Valve Delay | | | | | |
| Maximum Simultaneous Stations Per Program | | | | | |
| Program Water Window Start Time | | am/pm | am/pm | am/pm | am/pm |
| Program Water Window End Time | | am/pm | am/pm | am/pm | am/pm |

*FIG. 5B*

METHOD AND APPARATUS FOR PROGRAMMING A DECODER-BASED IRRIGATION CONTROLLER

This application is a continuation of U.S. application Ser. No. 12/837,381, filed Jul. 15, 2010, which is incorporated in its entirety herein by reference.

BACKGROUND OF THE INVENTION

1. Field of the Invention

The present invention relates generally to irrigation controllers, and more specifically to a method of programming a decoder-based irrigation controller.

2. Discussion of the Related Art

Decoder-based controllers and modular controllers are being used increasingly in the field. Some decoder-based controllers function as "standalone" controllers while other decoder-based controllers comprise a personal computer (PC) that runs central control software and functions as a central irrigation controller for tens (or hundreds) of irrigation stations. Irrigation control signals are distributed to the stations using a field interface unit that encodes the appropriate control signals onto a power signal (e.g., a sinusoidal alternating power signal) applied to a two-wire path. The decoders are coupled to the two-wire path to derive their operational power and decode the control signals from the two-wire path to control the actuation of a station coupled to the decoder.

With current decoder-based controllers, the controller must be programmed to record the association of decoders with stations. This requires that the user manually enter the data into the controller. Further, in many instances, the programming of the controller must be completed before the in-field installation of the decoders. This requires that the user predesignate the association of the decoders with stations. Furthermore, because the information must be entered beforehand, the user is required to install the irrigation controller before the installation of the decoders.

As such, a need exists for a method of programming a decoder-based controller which overcomes the limitation of the current methods of programming the irrigation controller.

SUMMARY OF THE INVENTION

Several embodiments of the invention advantageously address the needs above as well as other needs by providing a decoder-based irrigation controller comprising a microcontroller; and a first connector coupled to the microcontroller and configured to couple to a reader, wherein the reader comprises an optical reader configured to read an optically readable pattern, wherein the first connector is further configured to couple an input from the reader to the microcontroller; and wherein the microcontroller is configured to interpret the input from the reader and perform an action at the decoder-based irrigation controller according to the input.

In another embodiment, a method comprises receiving an input at a decoder-based irrigation controller from a reader, wherein the reader comprises an optical reader configured to read an optically readable pattern; interpreting the input from the reader; and performing an action at the decoder-based irrigation controller according to the input.

In another embodiment, a method for programming a decoder-based irrigation controller comprises associating a decoder unit with at least a first station, removing a decoder address indicator provided with the decoder unit and corresponding to an address of the decoder unit, wherein the decoder address indicator is machine readable and recording the decoder address indicator onto a programming chart onto an area designated for a decoder address associated with the first station In another embodiment, the invention can be characterized as a method for programming a decoder-based irrigation controller comprising associating a decoder unit with at least a first station of a plurality of stations, recording a decoder address of the decoder unit having been associated with the first station onto a programming chart onto an area designated for the decoder address associated with the first station, and inputting the decoder address into the decoder-based irrigation controller in order to register the association of the decoder unit with the first station, wherein the programming chart includes global information pertaining to the plurality of stations, where the user can view the global information simultaneously with the recorded decoder address in the area designated for the decoder address associated with the first station.

In yet another embodiment, the invention may be characterized as a programming chart for use in programming a decoder-based irrigation controller comprising a first medium having first viewable indicia thereon and defining a station specific portion, the first viewable indicia comprising a station number area corresponding to one or more stations being controlled by a decoder-based irrigation controller and including a station number for each station, a decoder address area proximate to the station number area and adapted to receive a recording indicating an address of a decoder associated with each of the one or more stations and a plurality of other information areas for each of the one or more stations each being designated to receive information pertaining to each of the one or more stations.

In another embodiment, the invention may be characterized as a decoder-based irrigation controller comprising a microcontroller and a first connector coupled to the microcontroller and configured to couple to a reader, wherein the reader comprises one or more of an optical reader and an electromagnetic reader, wherein the first connector is further configured to couple an input from the reader to the microcontroller. The microcontroller is configured to interpret the input from the reader and perform an action at the decoder-based irrigation controller according to the input.

In yet another embodiment, the invention may be characterized as a method comprising receiving an input at a decoder-based irrigation controller from a reader, wherein the reader comprises one or more of an optical reader and an electromagnetic reader, interpreting the input from the reader and performing an action at the decoder-based irrigation controller according to the input.

BRIEF DESCRIPTION OF THE DRAWINGS

The above and other aspects, features and advantages of several embodiments of the present invention will be more apparent from the following more particular description thereof, presented in conjunction with the following drawings.

FIG. 4 illustrates a detailed view of one embodiment of a specific portion of a programming chart according to one or more embodiments of the present invention.

FIG. 5A illustrates a detailed view of a first side of a global portion of a programming chart according to one or more embodiments of the present invention.

FIG. 5B illustrates a detailed view of a second side of the global portion of FIG. 5A according to one or more embodiments of the present invention.

Figure 1:
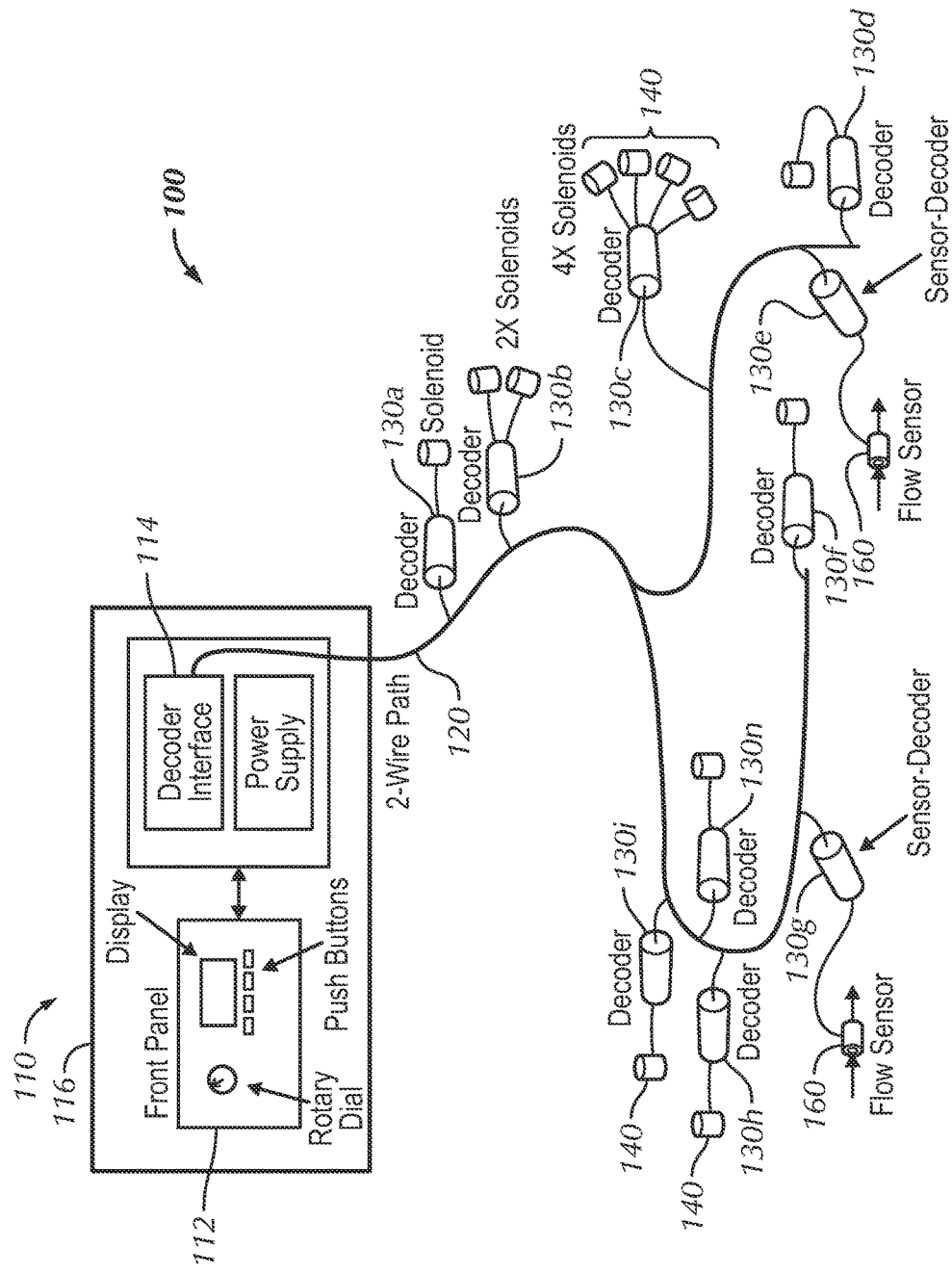
FIG. 1 illustrates a system diagram of an exemplary decoder-based irrigation control system according to one or more embodiments of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Referring first to FIG. 1, an exemplary decoder-based irrigation control system 100 is illustrated according to one or more embodiments. As illustrated, in one embodiment, the decoder-based system 100 comprises an irrigation controller 110 in communication with one or more decoders 130a-n. In some embodiments, each decoder 130a-n is coupled to one or more stations/master valves 140 and/or sensors 160. In some embodiments, one or more stations 140 each actuate a water flow control valve.

In one embodiment, the irrigation controller 110 includes the functionality of traditional central control software and a traditional field interface device in the same controller housing 116. That is, the controller 110 includes a front panel 112 and a decoder interface 114 within the housing 116. In one embodiment, the front panel 112 includes the user interface to allow the user to program the desired irrigation schedules. In one embodiment, the decoder interface 114 encodes the appropriate control signals onto a power signal, e.g., a sinusoidal alternating power signal, applied to the two-wire path 120.

In an alternative embodiments (not shown), a personal computer (PC) runs central control software and functions as a central irrigation controller for tens (or hundreds) of irrigation stations. Irrigation control signals are distributed to the stations using a field interface unit that encodes the appropriate control signals onto a power signal (e.g., a sinusoidal alternating power signal) applied to a two-wire path. The decoders are coupled to the two-wire path to derive their operational power and decode the control signals from the two-wire path to control the actuation of a station. In some embodiments, the system 100 uses sinusoidal AC power signals which are selectively clipped to communicate data to the decoders.

In some embodiments, the decoders 130a-n are coupled to the two-wire path 120 to derive their operational power and decode the control signals from the two-wire path to control the actuation of a station 140. In some embodiments, one or more of the decoders 130a-n contain sensor functionality to sense temperature, soil moisture, water flow rate, etc. In one embodiment, as illustrated for example, decoders 130e and 130g are sensor decoders and are coupled to sensors such as for example flow sensors 160. Information may be communicated back from the decoders to the irrigation controller 110 and/or a central personal computer in communication with the irrigation controller 110 via the decoder interface 114. In one embodiment, system 100 uses sinusoidal AC power signals which are selectively clipped to communicate data to the decoders 130a-n. In another embodiment, the system 100 uses modulated squarewave power signals to communicate data to the decoders 130a-n.

Figure 2A:
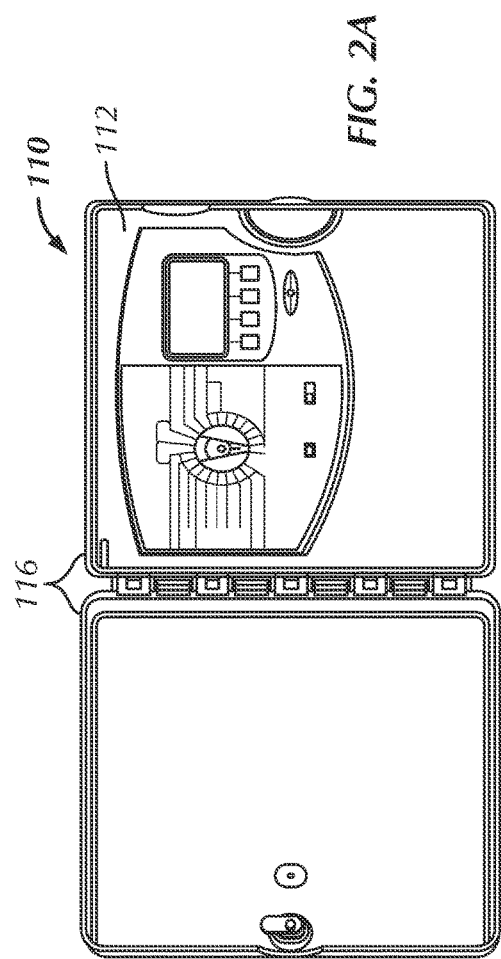
FIG. 2A illustrates an exemplary embodiment of a first portion of decoder controller in accordance with one or more embodiments of the present invention.
Figure 2B:
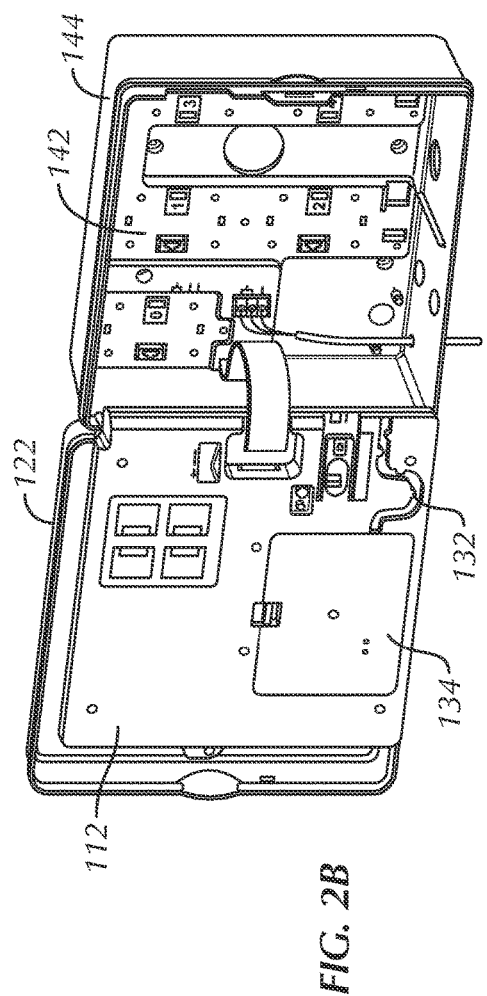
FIG. 2B illustrates an exemplary embodiment of a second portion of decoder controller in accordance with one or more embodiments of the present invention.

Referring next to FIGS. 2A and 2B, an exemplary embodiment of a decoder controller 110 in accordance with several embodiments is illustrated. In one embodiment, the decoder controller 110 includes the front panel 112 and the decoder interface 114 contained within the housing 116. In some embodiments, the decoder interface 114 may take the form of a module that inserts into the backplane 142 of the controller 110. The front panel 112 includes a user interface to allow the user to program the desired irrigation schedule/s and the decoder interface 114 functions to encode data on power signals delivered to the decoders and/or sensor-decoders via the two-wire path. Next, in some embodiments, the decoders and/or sensor decoders decode the data and instructions in order to control irrigation.

In one embodiment, the controller 110 is a modular irrigation controller that has an expandable architecture. As shown, in some embodiments, the expandable architecture irrigation controller 110 is installed in a water-resistant controller housing 116.

The controller housing 116, formed of plastic or other suitable material, is designed to withstand various environmental conditions. In one embodiment, the controller housing 116 includes rear housing 144 and door 122 that enclose the electrical components housed within the housing 116. In one embodiment, the housing 116 encloses the irrigation controller components such as the front panel 112 and the decoder interface module 114, to protect their electronic components and connections.

Figure 10:
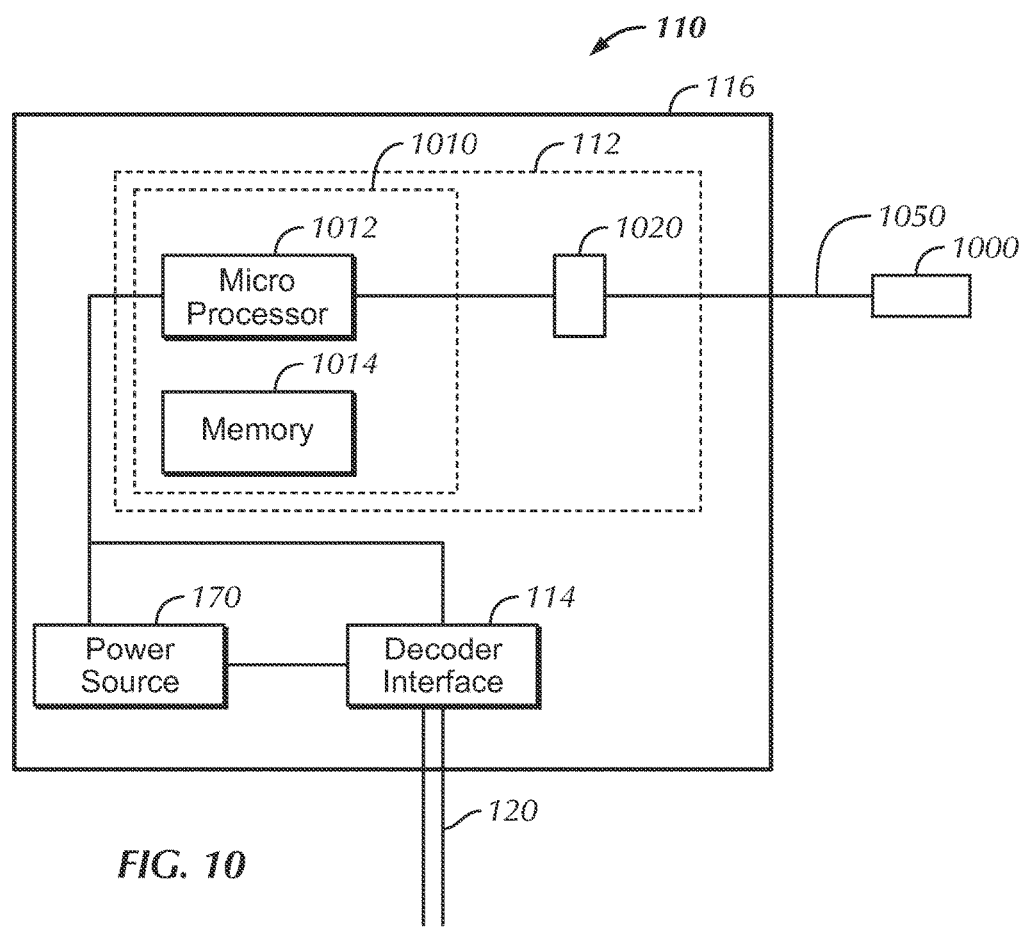
FIG. 10 illustrates a block diagram of a decoder-based irrigation controller according to one or more embodiments of the present invention.

FIG. 10 illustrates an exemplary block diagram of a decoder-based irrigation controller according to several embodiments of the present invention. In one embodiment, the decoder-based irrigation controller 110 comprises a front panel 112 and a decoder interface 114 contained within the housing 116. In some embodiments, the controller 110 further comprises a power source 170. In one embodiment, the front panel 112 may comprise a microcontroller 1010 and a connector 1020. In one embodiment, the microcontroller 1010 may comprise a microprocessor 1012 and a memory 1014.

The microcontroller 1010 is in communication with the connector 1020, and is further in communication with the decoder interface 114. In one embodiment, the microcontroller 1010 contains firmware for programming the controller 110. In another embodiment, the microcontroller 1010 is configured to carry out the irrigation schedules and programs of the irrigation controller and communicate the irrigation commands to the decoder interface to control one or more field decoders and control one or more solenoids or sensors.

In several embodiments, the connector 1020 provides a means for connecting to various external devices providing extra functionality to the controller 110. In one embodiment, as illustrated in FIG. 10, the connector 1020 provides a connection to a reader 1000, such as the barcode pen 900 illustrated in FIG. 9 or other optical or electromagnetic reader. For example, in one embodiment, the reader 1000 is connected to connector 1020 by means of a cable or other connector 1050. In some embodiments, the microcontroller 1010 is configured to interpret signals from the reader 1000 and is further configured to perform one or more actions based on the data corresponding to the signals.

In one embodiment, the microcontroller 1010 is configured to receive input from the reader 1000 connected to front panel by way of connector 1020, and use the input to program the controller. For example, in one embodiment, decoder/station associations may be stored within the controller via the input received from the reader 1000 and interpreted by the microcontroller 1010. In such embodiments, the microcontroller 1010 may receive the data or input and perform one or more actions based on the data or input. For example, in one embodiment, the microcontroller 1010 may cause an association between one or more decoders and stations to be stored, for example within the memory 1014. The memory 1014 is illustrated as being internal to the microcontroller 1010, however, in some embodiments, the memory 1014 may be external to the microcontroller 1010 and in communication with the microcontroller 1010.

In another embodiment, the connector may provide a connection to modular cartridges facilitating several additional functionalities to the controller. In one embodiment, the connector provides a connection between the microcontroller 1010 and external cartridges, such that the programming of the irrigation controller 110 may be performed by one or both the microcontroller 1010 and the external modular cartridges.

Figure 11:
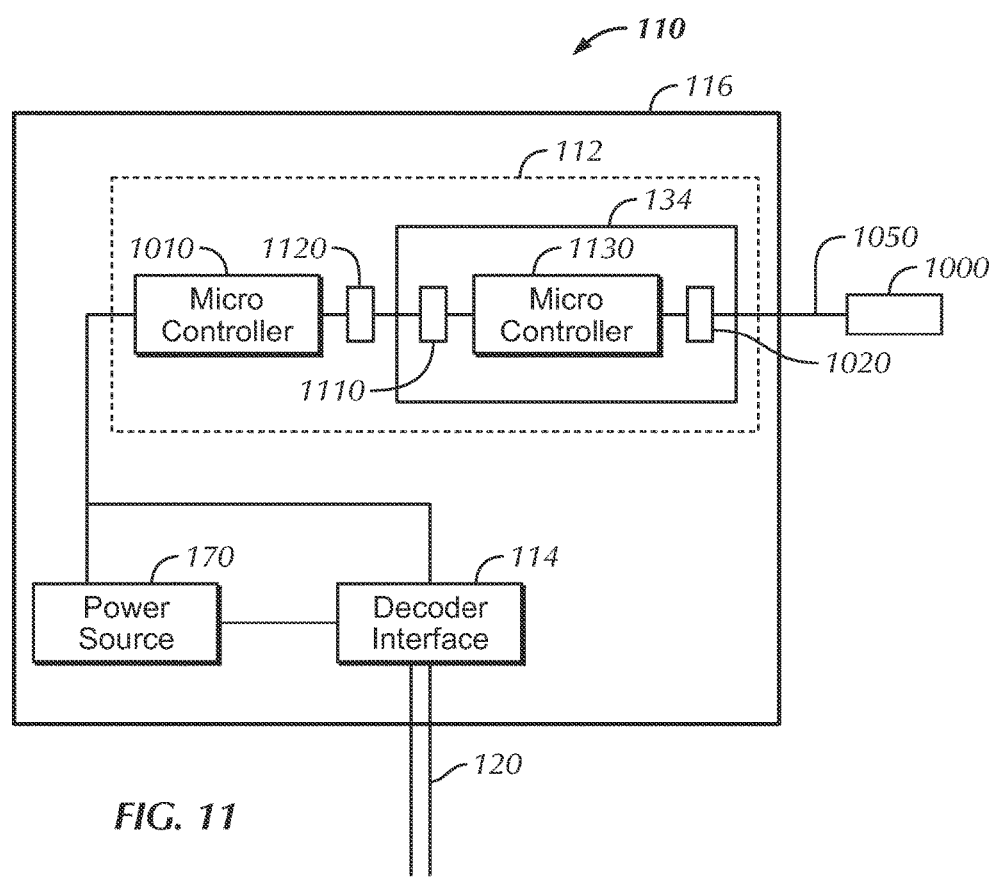
FIG. 11 illustrates an alternative block diagram of a decoder-based irrigation controller according to one or more embodiments of the present invention.

FIG. 11 illustrates an exemplary block diagram of a decoder-based irrigation controller having a programming cartridge according to several embodiments of the present invention. As illustrated, the decoder-based irrigation controller 110 comprises a front panel 112 and a decoder interface 114 contained within the housing 116. In some embodiments, the controller 110 further comprises a power source 170. In one embodiment, the front panel 112 may comprise a microcontroller 1010 and a connector 1020. In one embodiment, a connector 1120 is connected to a programming cartridge 134 contained within the housing 116. The microcontroller 1010 is in communication with the programming cartridge 134 through the connector 1120 and is further in communication with the decoder interface 114.

In one embodiment, the programming cartridge may be attached to the back of the front panel 112 and may be connected by way of a first connector 1110 to the front panel connector 1120. In one embodiment, the programming cartridge is further in communication with the microcontroller 1010. For example, in one embodiment, the programming cartridge 134 is adapted to be removably connected to the back side of the front panel 112 within the housing as illustrated in FIG. 2B.

In several embodiments, the programming cartridge 134 receives operational power from the front panel 112 when connected. In one embodiment, the programming cartridge may comprise a microcontroller 1130 to provide additional functionality. In one embodiment, the programming cartridge 134 comprises the connector 1020 for receiving external devices that may provide additional capabilities to the irrigation controller. In one embodiment, the programming cartridge may comprise the connector 1020 for connecting external devices to the irrigation controller 110 and specifically the front panel 112. In one embodiment, the programming cartridge 134 may additionally comprise memory (e.g. part of or coupled to the microcontroller 1130) and may act as an additional or backup storage for the front panel.

According to several embodiments, the connector 1020 (e.g., RS-232 or PS/2) allows a reader 1000 such as an optical and/or electromagnetic reader and or other reader to be connected to the irrigation controller. For example, in one embodiment the reader 1000 is a barcode pen 900 of FIG. 9 and is plugged into the cartridge 134. In another embodiment, other readers such as an RFID reader or other electromagnetic reader may be used. For example, in one embodiment, the reader 1000 is connected to connector 1020 by means of a cable or other connector 1050. In some embodiments, the reader 1000 may comprise a combination of a barcode reader and an RFID reader.

In one embodiment, the programming cartridge microcontroller 1130 is configured to receive input from the reader 1000 and is configured to interpret the input and/or store data based on the input. For example, in one embodiment the input from the reader 1000 comprises signals corresponding to data. In one embodiment, the microcontroller 1130 receives the input signals and interprets the signals to collect the data corresponding to the signals. In some embodiments, the microcontroller 1130 is further configured to perform one or more actions based on the signals. For example, in one embodiment, as described throughout this specification, the data may comprise decoder address and station numbers, and microcontroller 1130 may be configured to retrieve the data and store associations between decoders and station numbers.

In yet another embodiment, the microcontroller 1130 may be configured to send the data to the microcontroller 1010. In one embodiment, for example, the microcontroller 1130 of the programming cartridge is a pass through in that it passes information received from the reader 1000 to the microcontroller 1010. In one embodiment, the microcontroller 1130 translates the signaling from the reader 1000 into data to be processed by the microcontroller 1010 and in a format that is usable by the microcontroller 1010. The microcontroller 1010 then performs any necessary actions based on the information received. Additionally, the microcontroller 1010 may store at least some of the data within its memory and/or may cause at least some of the data to be stored in or by the microcontroller 1130.

For example, in one embodiment, through the connection to the front panel, the programming cartridge 134 is in communication with the microcontroller 1010. In one embodiment, the microcontroller 1010 is configured to receive input from the reader 1000 connected to the programming cartridge 134, and use the input to program the controller. For example, in one embodiment, decoder/station associations may be stored within the controller via the input received from the reader 1000 and interpreted by the microcontroller 1010 and/or microcontroller 1130. In such embodiments, the microcontroller 1010 may receive the data and perform one or more actions based on the data. For example, in one embodiment, the microcontroller 1010 may cause an association between one or more decoders and stations to be stored, for example within the memory 1014. In a further embodiment, the programming cartridge may simply pass through the signals from the reader 1000 to the microcontroller 1010 and the microcontroller 1010 at the front panel 112 may interpret the signals to attain the data corresponding to the signal. In yet another embodiment, the reader 1000 may send data that is already in the form which can be processed by the microcontroller 1010 and/or microcontroller 1130.

As described in further detail below, in some embodiments, decoders and sensor-decoders will include barcodes that indicate the address of the particular device. Additionally, barcode stickers may be placed next to the stations/master valves/sensor numbers. In some embodiments, the user is able to scan barcoded decoders and sensor-decoders, and also scan the barcode for the station/master valve/sensor that the user would like to associate each decoder (or sensor-decoder) with. In some embodiments, the barcodes may be scanned in any order. In one embodiment, once the user has scanned all of the barcodes for the decoder addresses as well as the station/master valve and sensor numbers, the decoder addresses and the associations to specific stations, master valves and/or sensors may be transferred to the front panel 112. Thus, the user is able to build an accurate list of the addresses (and associated stations, etc.) for the front panel of all decoder devices before or after they are installed. This will serve as an alternative to embodiments where the users have to manually enter the addresses of each decoder device and associated stations. In several embodiments, a test barcode may be provided that allows the user to verify that the barcode scanner functionality of the programming cartridge 134 is properly working and/or to configure the barcode reader or scanner, for example, as described further below.

Figure 3A:
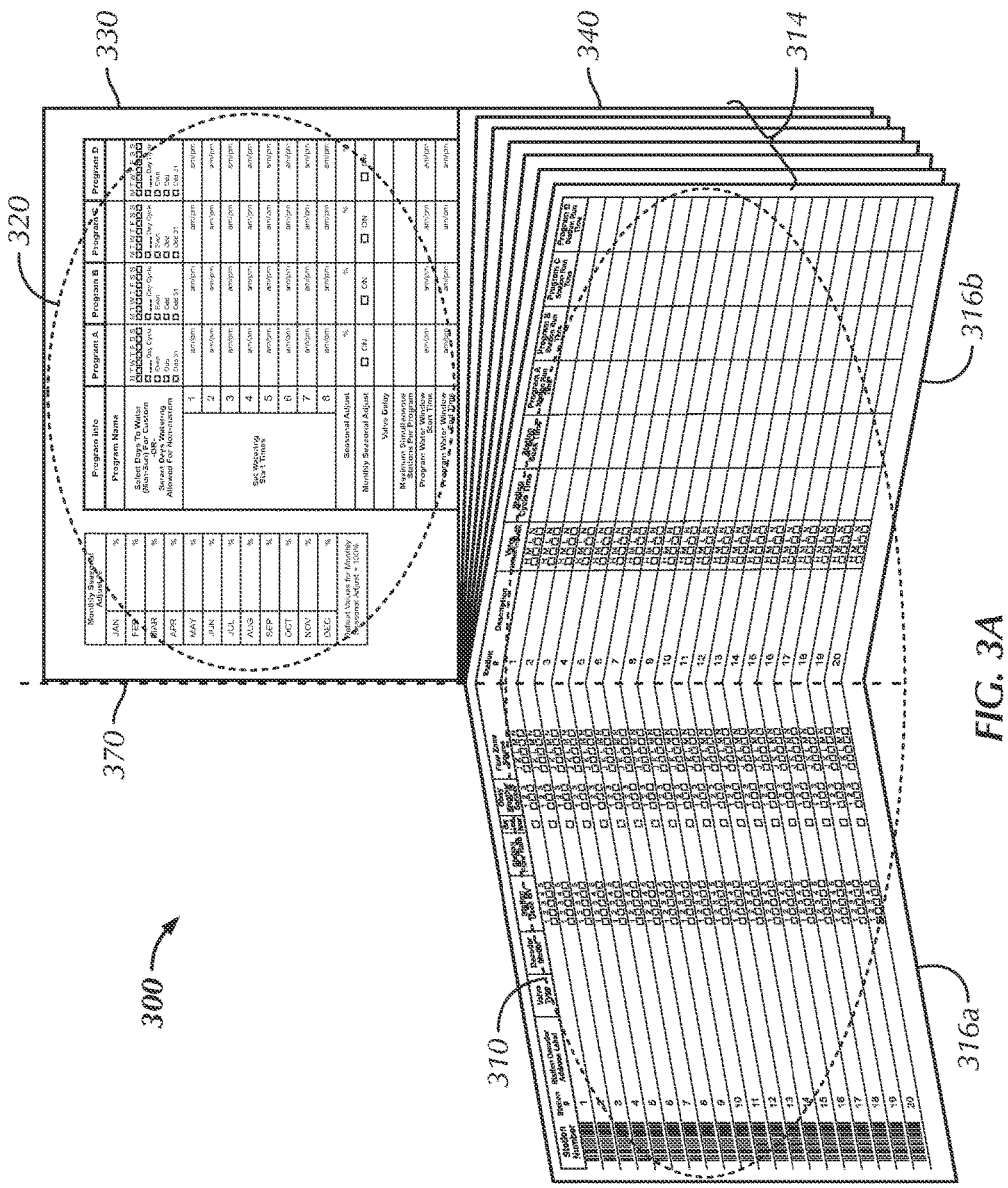
FIG. 3A illustrates a first view of a programming chart in accordance with one or more embodiments of the present invention.
Figure 3B:
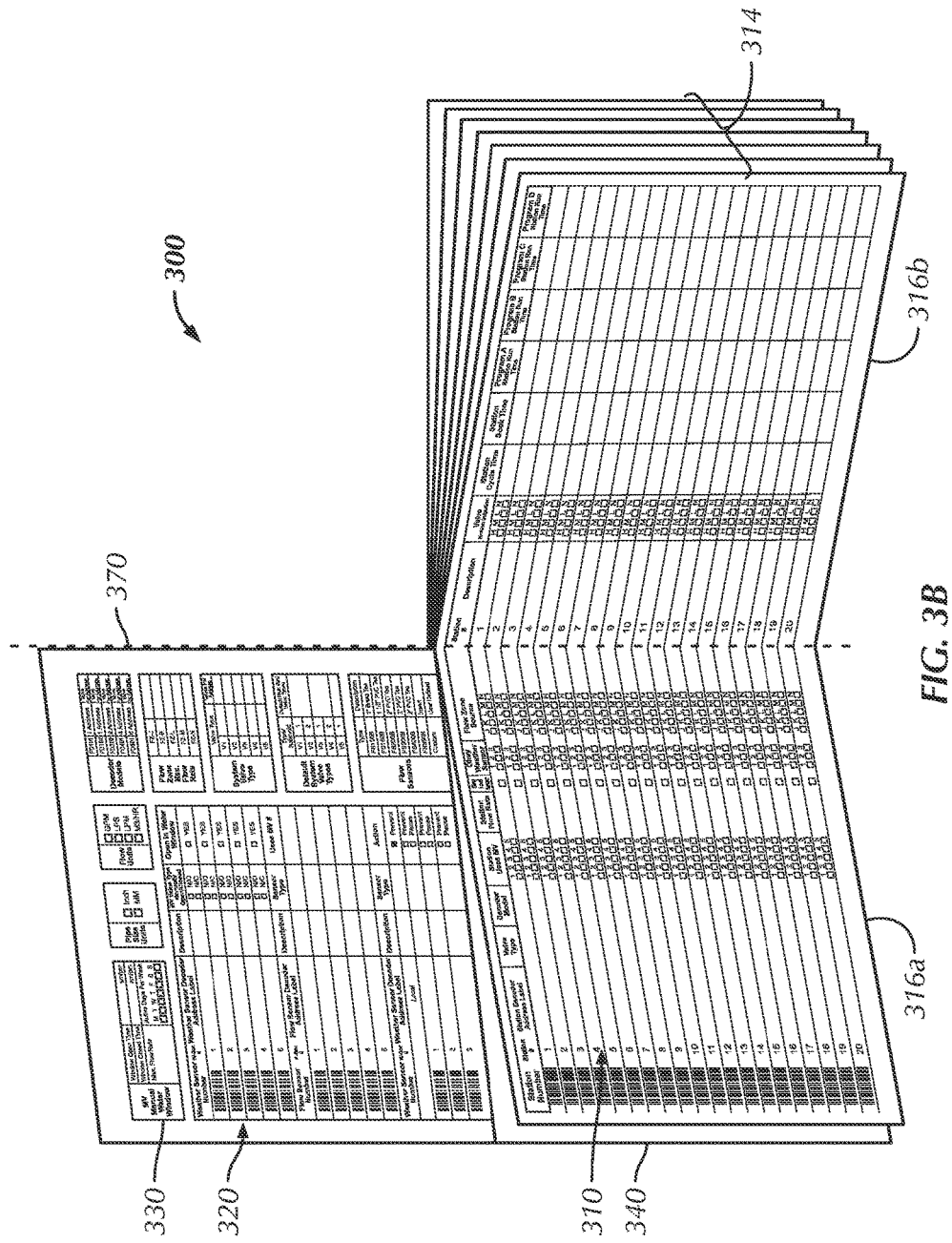
FIG. 3B illustrates a second view of the programming chart of FIG. 3A in accordance with one or more embodiments of the present invention.

Referring next to FIGS. 3A and 3B, a programming chart 300 is illustrated according to one or more embodiments of the present invention. According to several embodiments, the programming chart provides an aid for programming a decoder-based controller, such as controller 110. In several embodiments, the programming chart comprises viewable indicia printed onto a medium. For example, as illustrated, in one or more embodiments, the programming chart 300 comprises a booklet made up of a medium such as paper, paper like material, plastic material etc., having a chart printed thereon. In another embodiment, where the chart may be computerized, and adapted to be displayed on a portable device such as a PDA, portable computer, etc, the medium may comprise a computer display surface or screen or other types of electronic displays. It should be noted that these are merely examples of media and that the programming chart may comprise other types of media. In several embodiments, the printing on the pages of the specific portion may be broadly characterized as viewable indicia on the medium. In other embodiments, viewable indicia may be the illumination of pixels or display elements of a display surface or screen. In one embodiment, the programming chart may comprise a first medium and second medium, each having a thickness. In one embodiment, for example, the programming chart comprises a first medium having viewable indicia thereon defining a specific portion 310 having a thickness, and a second medium having viewable indicia thereon defining a global portion 320 having a thickness. In one embodiment, the thickness of the first medium is different than the thickness of the second medium. For example, in some embodiments the second medium has a thickness that is greater than the thickness of the first medium.

As illustrated in FIGS. 3A and 3B, in one or more embodiments, the programming chart 300 comprises a station specific portion 310 and a global portion 320. In some embodiments, the station specific portion 310 comprises a plurality of pages 314 each having printed thereon a number of rows and columns. In one embodiment, each row corresponds to a specific station while the columns comprise information regarding the stations. In one or more embodiments, the station specific portion 310 is a booklet having a front cover (not shown) and a back cover 340 and several pages 314, and being bound in such a manner that can be laid out to display two adjacent pages 316a and 316b side-by-side, wherein information specific to each station spans the two adjacent pages. In this illustrated embodiment, the global portion 320 is printed on a flap 330 foldably coupled to the back cover 340.

Figure 4:
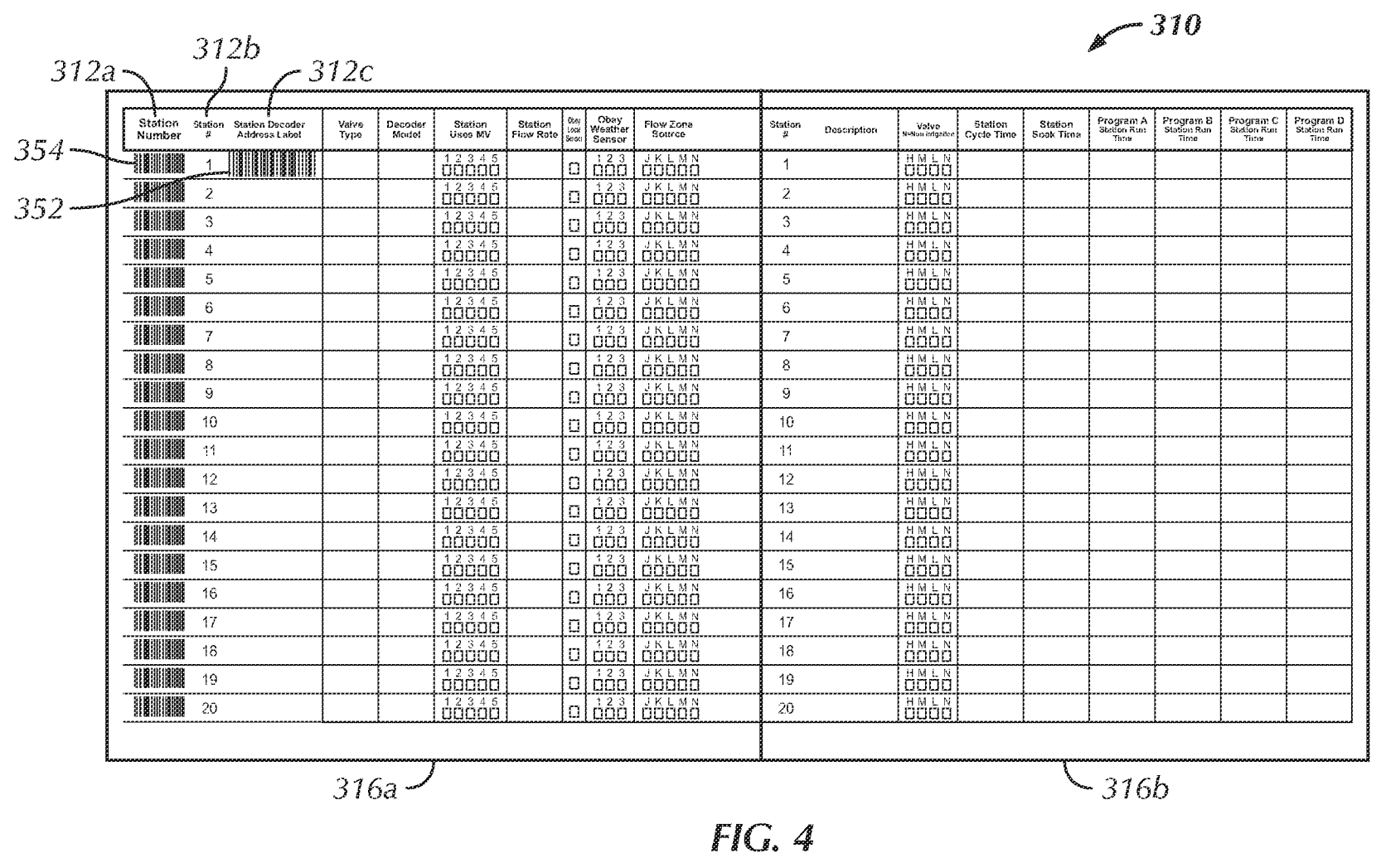

FIG. 4 provides a detailed illustration of one embodiment of the specific portion 310. As illustrated, in one embodiment, a column 312a of the specific portion 310 comprises a preprinted barcode corresponding to the station or station number. In one embodiment, another column 312b indicates station numbers in numerical order. That is, in one embodiment, the column 312a comprises a barcode representing the given station number of column 312b. In one embodiment, the preprinted barcode further comprises an identifier, which is used to indicate that the specific barcode is a station number barcode. In an alternative embodiment, station number barcodes may not be preprinted, instead, barcodes may be provided with each station and/or valve and will be recorded onto column 312b, for example at the time the station is associated with a decoder. In another embodiment, column 312b may not comprise barcodes, and the user will have to hand write or enter the station number manually into the designated area in column 312b. In some embodiments, another column 312c comprises an area for recording a station decoder address. That is, each decoder 130 of the system 100 comprises at least one address (e.g., a serial number) programmed that is unique to that decoder and is programmed or assigned during manufacturing.

In one embodiment, the user may manually enter the number onto the chart, i.e. handwrite the number or enter it using an input device. In another embodiment, the decoders 130 are provided with at least one barcode corresponding to the specific decoder address. In one embodiment, where a decoder is capable of supporting a number of stations/master valves and/or sensors, for each of the available connections a specific barcode with a specific decoder address is provided. For example, FIG. 4 illustrates an exemplary decoder barcode 352 having been applied to the programming chart 300. The decoder barcode 352 may correspond to an address of one of the decoders 130 *a-n* having been associated with the station number 1 of the system 100. Furthermore, as illustrated in FIG. 4, a barcode 354 is provided. Barcode 354 indicates the number of the station having been associated with a decoder, in this example, station number 1. When the barcodes 352 and 354 are scanned into the system the controller will recognize the station number and decoder address and will further determine that they have been associated with one another. In another embodiment, the station number barcode 352 may not be provided. That is, the association of the decoder with a specific station may be registered using only decoder barcodes. In one embodiment for example, the user may scan the decoder barcodes in numerical order, such that the scanning will result in the first barcode scanned in being associated with station number 1 and so forth. In yet another embodiment, the user may be able to select the station number manually and then scan in the barcode of the decoder being associated with that station number.

Figure 8:
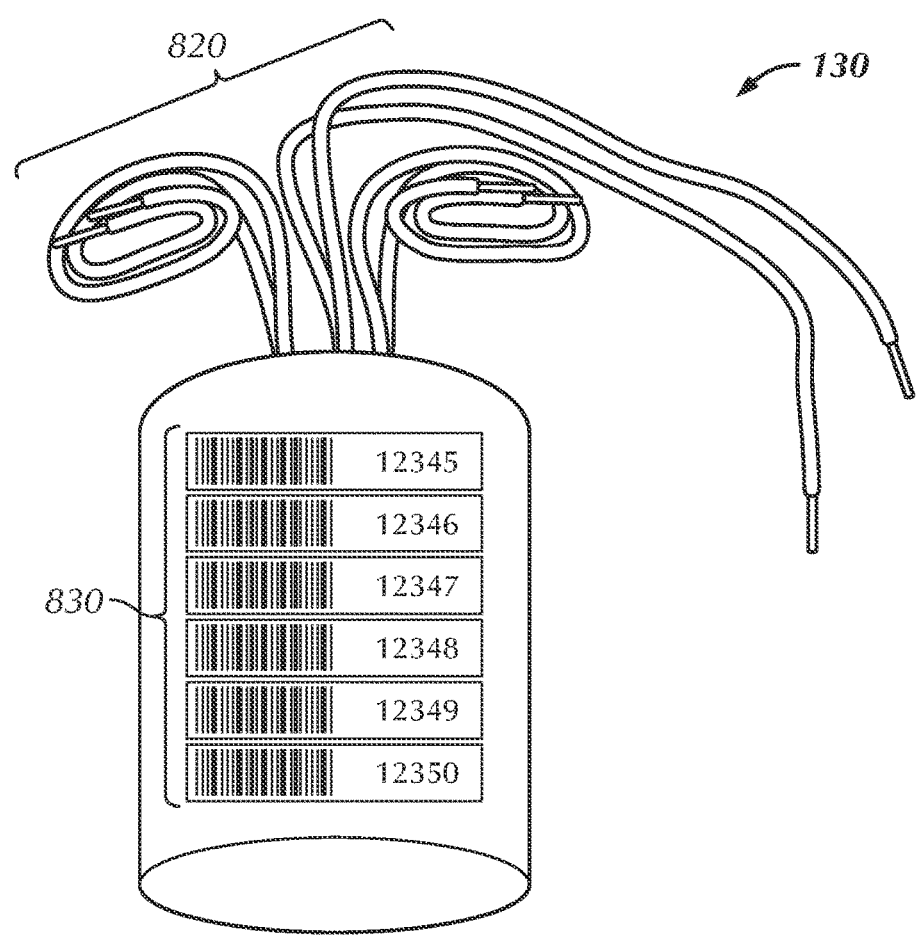
FIG. 8 illustrates an exemplary decoder unit according to one or more embodiments of the present invention.

For example, FIG. 8 illustrates an exemplary decoder according to one embodiment of the invention. As illustrated, decoder 130 comprises connections 820. The decoder 130 is shown as having 6 connections, however, it should be understood that the decoder is capable of supporting any number of connections. For example, in one embodiment, one or more decoders may support only a single connection, while in other embodiments one or more decoders may support up to four connections. As illustrated in FIG. 8, a barcode 830 is provided for each connection supported by the decoder 130. The barcode may further comprise a decoder identifier such that when it is scanned by the user it is recognized by the controller 110 as a decoder address. While a 2D barcode is shown in FIG. 8, in several different embodiments, different types of machine readable address indicators and/or labels may be provided with the decoder. For example, 3D barcodes, optically readable patterns, electromagnetically readable devices such RFID tags, etc., may be provided in lieu of the barcodes 830 illustrated in FIG. 8. Each of such machine readable address labels may be further provided with a decoder identifier such that when it is scanned by the user it is recognized by the controller 110 as a decoder address.

At the time of installation, when decoders 130 are associated with a specific station, master valve or sensor, the user can remove the barcode provided with the decoder or decoder connection and place the barcode next to the station number for the specific station (for example, in column 312*c*), and or alternatively in the area designated for the specific master valve and/or sensor (described in more detail below). In some embodiments, after association of all of the decoders using the programming chart 300, the user is able to take the chart to the controller with an attached barcode reader, and scan decoder barcodes, and also scan the barcode for the station/master valve/sensor coupled to each decoder or sensor-decoder. In some embodiments, the barcodes may be scanned in any order. In one embodiment, once the user has scanned all of the barcodes, the addresses may be transferred to the front panel 112.

Thus, the user is able to automatically build an accurate list of the addresses (and associated stations, etc.) for the front panel of all decoder devices after they are associated with stations, master valves and/or sensors. As a result, the user will successfully and efficiently program the controller. In addition, the user does not need to worry about errors in entering the addresses manually. Additionally, the user will be able to install the controller, such as controller 110 at any time during the process in comparison to a some controllers where the controller must be installed before the in field installation of the decoders and the associations between the decoders and stations/master valves and/or sensors must be predesignated before the in field installation. Furthermore, this will serve as an alternative to embodiments where the users have to manually enter the addresses of each decoder device and associated stations/master valves and/or sensors, and therefore, provides for a faster and easier way to program the controller while avoiding any human error that may occur during manual programming of the controller.

In addition to this information, columns are provided to record information specific to each station such as valve type, decoder model, the specific master valve used by the specific station, station flow rate, whether the station obeys a local sensor, whether the station obeys a weather sensor and further which weather sensor the station obeys, flow zone source, station description, station priority, station cycle time, station soak time, and run time for the one or more programs, such as programs A, B, C and D illustrated in FIG. 4. In several embodiments, all information in the station specific portion 310 is information specific to each station (in each row) of the station specific portion 310.

Figure 5A:
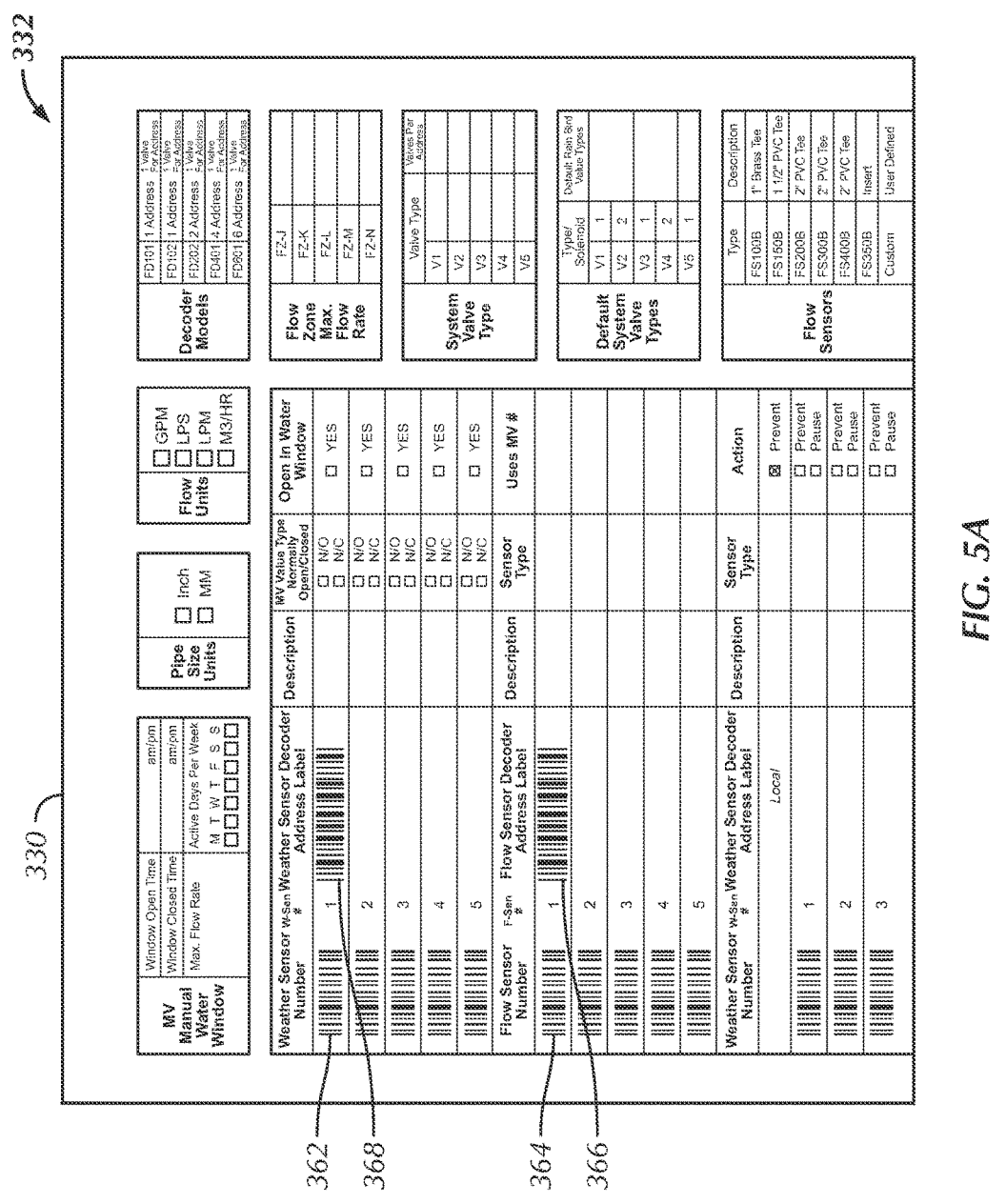
Figure 5C:
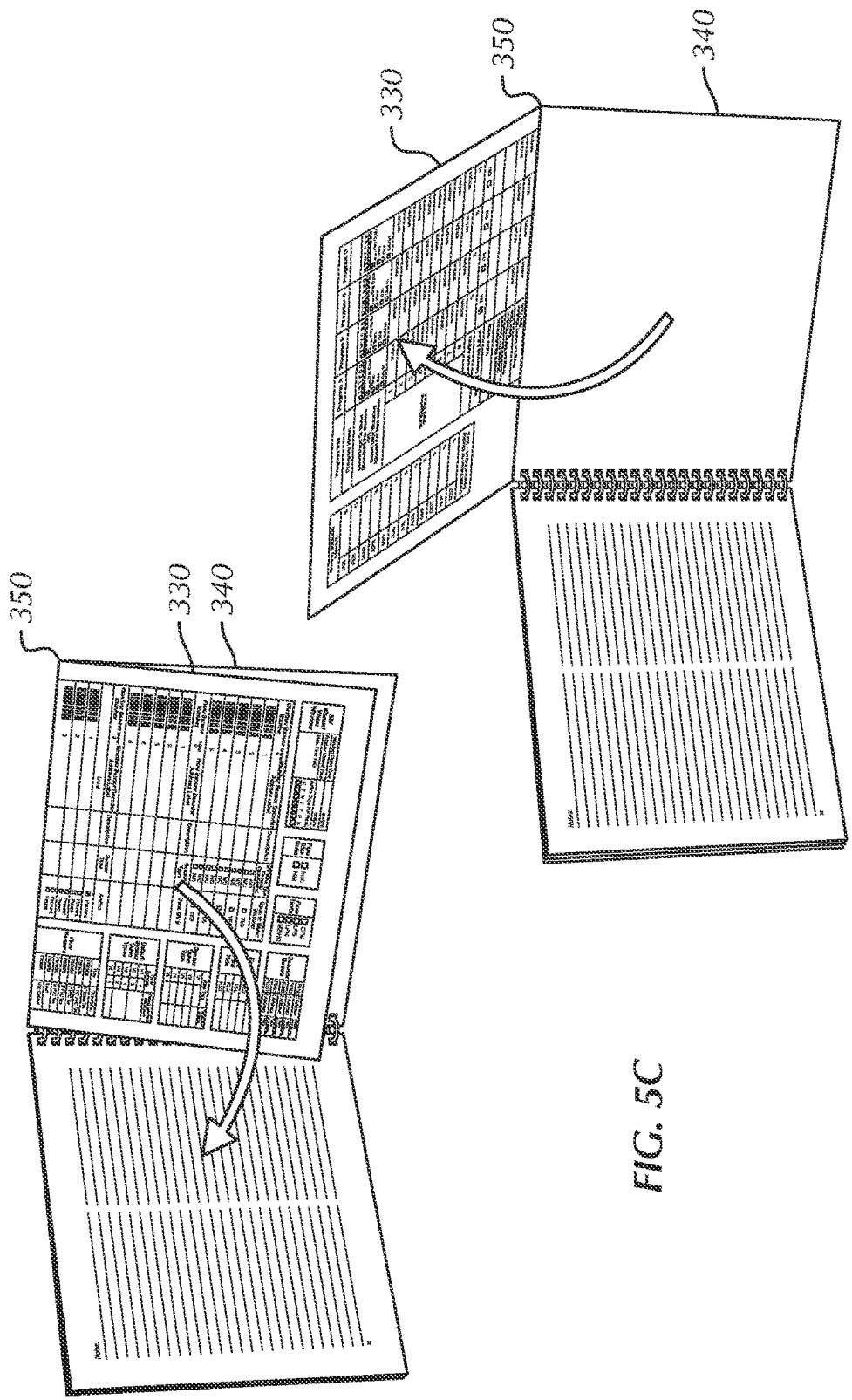
FIG. 5C illustrates a detailed view of the orientation of the global portion with respect to the programming chart of FIGS. 3A and 3B.
Figure 5D:
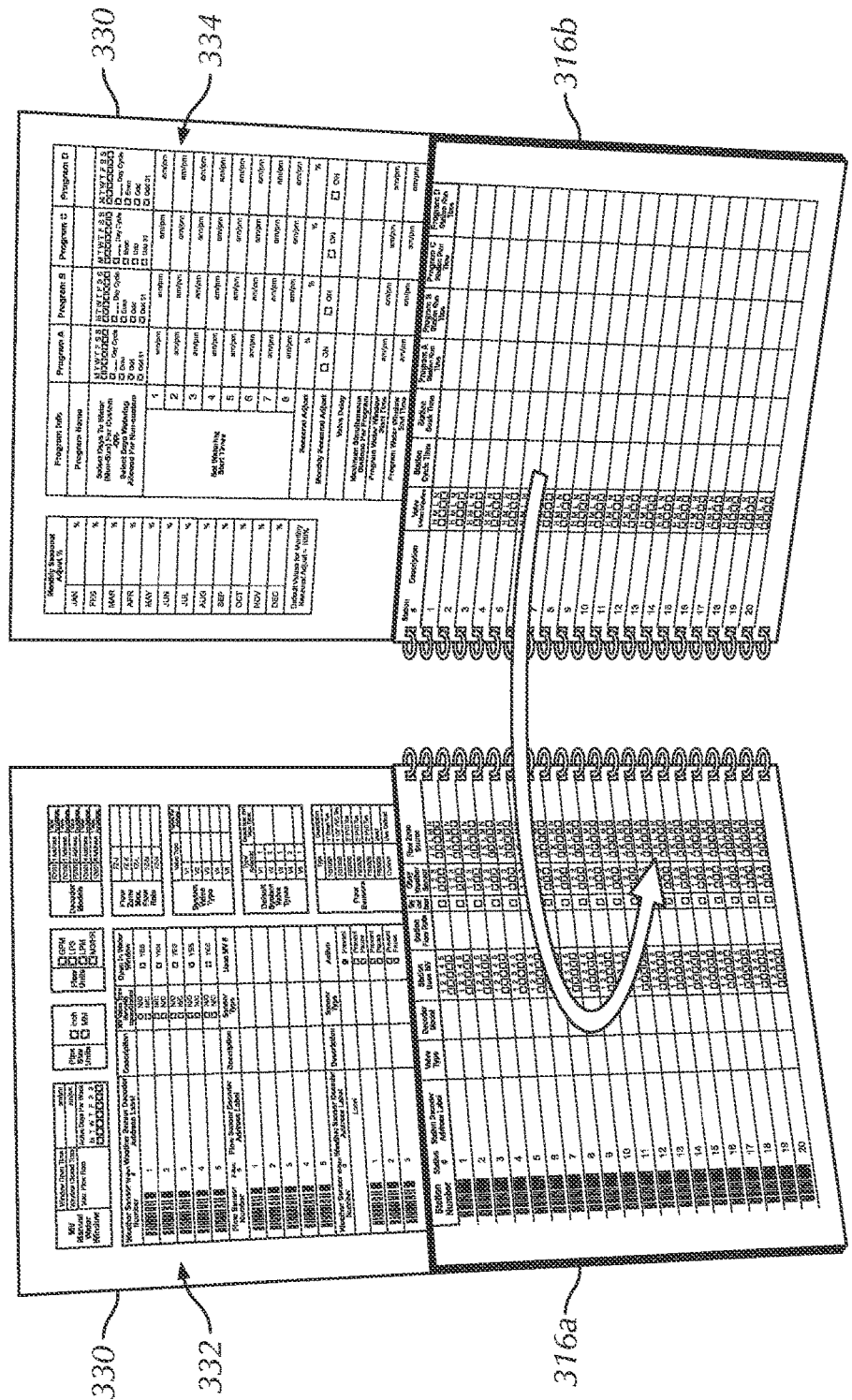
FIG. 5D illustrates an exemplary movement of the general portion with respect to the specific portion of FIG. 4.

Referring back to FIGS. 3A and 3B, in one embodiment, the global portion 320 comprises a flap 330 having printed thereon global or general information pertaining to all of the stations. FIGS. 5C and 5D provide an exemplary embodiment of the general portion flap according to several embodiments of the present invention. In one embodiment, the global portion flap 330 is attached to or an extension of the back cover 340. In one embodiment, as illustrated in FIG. 5C, the global portion flap 330 folds about a fold line 350 joining the flap 330 to the back cover 340. As shown in FIG. 5C, the global portion flap 330 is adapted to fold over into the inside of the cover 340. Furthermore, as illustrated in FIG. 5D, the flap 330 is adapted to rotate from the back onto the front of the chart 300, such that when rotated to the front, the first or front side 332 of the flap 330 is visible to the user simultaneously with the specific portion, and when rotated to the back about the axis 370 the second or back side 334 of the flap 330 is visible to the user simultaneously with the specific portion. Accordingly, in several embodiments, the design of the global portion flap 330 allows the user to view the first side and or second side while the user is viewing information pertaining to a single station, without having to move away from the specific information of the station being viewed.

In one embodiment, the global information is recorded on the global portion 320 to assist in filling out the information specific to the controller and/or each station. In one embodiment, global portion 320 has information printed thereon on both sides of the flap 330. In one embodiment, the information on each side of the flap 330 is specific to the corresponding side of the specific portion 310 such that the specific page the user can view the corresponding global information to assist in filling out the specific information for each station.

As described above, in some embodiments, the specific portion 310 is extended across two adjacent pages 316a and 316b in a booklet form. In one or more of such embodiments, the global portion is printed such that it comprises a first side 332 and a second side 334. Furthermore, in some embodiments, the global portion may be moved from the first side of the specific portion booklet, to the second side of the specific portion booklet as illustrated in FIGS. 3A and 3B and FIG. 5D. As shown in FIGS. 3A and 3B and FIG. 5D, the general portion is designed to move from a first side 316a of the specific portion 310 to a second side 316b of the specific portion 310 about an axis 370. As shown, the movement is such that when moved to a first side of the specific portion, a first side of the two sided global portion 320, illustrated in FIG. 5A, is displayed, and when moved to the second side of the specific portion, the second side of the global portion 320, illustrated in FIG. 5B, is displayed.

In one embodiment, as illustrated in FIGS. 3A, 3B and 5D this is done such that while on the first side 332, the global portion 320 displays global information pertaining to data that is viewable on the first side 316a of the specific portion 310, and while on the second side 334, the global portion 320 displays global information pertaining to data that is viewable on the second side 316b of the specific portion 310. For example, as illustrated in FIG. 3A, the second side of the global portion 320 comprises information relevant to the data recorded on the right side 316b of the booklet. Further, as shown in FIG. 3B, a first side of the global portion 320 comprises information which is relevant to the data recorded on the left side 316a of the booklet. FIGS. 5A and 5B provide a detailed illustration of the global portion 320. In one embodiment, FIG. 5A corresponds to a first side 332 of the global portion 320, while FIG. 5B corresponds to a second side 334. As illustrated in FIG. 5A, in one embodiment, the data displayed on a first side 332 of the global portion 320 comprises, master valve manual water window information including window open time, close time, maximum flow value, and active days. In further embodiments, information regarding decoder models, system valve types, default system valve types, flow zone flow rates including for example maximum flow rates, default system valve types, system sensor types such as flow sensor types and descriptions, and other information pertaining to stations, valves, master valves and sensors used within the system may be provided on the global portion. In one embodiment, the global portion further comprises an indication of the units of measurement used, such as for example, pipe size unit of measurement and flow unit of measurement used, to provide the user with consistency in entering data pertaining to each station into the specific portion 310 and further when programming the controller 110.

In one embodiment, information pertaining to decoder addresses coupled to the master valves and sensor decoders is also provided on the global portion 320, and more specifically, according to several embodiments, on the first side 332 of the global portion. In one embodiment, for each master valve of the system 100, a master valve number, a master valve decoder address, a description, master valve type, as well as information pertaining to whether the master valve is normally open or close, and the water window in which the master valve is open in is recorded onto the global portion 320. In one embodiment, similar to the decoders coupled to the individual stations, the decoders coupled to the master valve are provided with barcodes which record the decoder number, and the barcodes are removed from the decoder and fixed onto the global portion 320. Furthermore, the master valve number may be preprinted onto the global portion 320 as a barcode, or alternatively the master valve may be provided with a barcode that can be recorded onto the chart. In such embodiments the master valve number barcode can be scanned into the system. In one embodiment, the decoder address barcode further comprises a decoder identifier such that when it is scanned into the system using a barcode scanner the system will recognize the scanned in data as a barcode address. In one embodiment, the master valve number barcode similarly comprises an identifier to indicate to the system that the scanned in information pertains to a master valve number.

While the exemplary embodiments throughout this specification refer to a barcode, it should be noted that in several different embodiments, different types of machine readable decoder address indicators and master valve number indicators may be used. For example, 3D barcodes, optically readable patterns other than barcodes, electromagnetically readable devices such RFID tags, etc., may be provided in lieu of the barcodes 362 and 368 illustrated in FIG. 5A and barcode 830 illustrated in FIG. 8. Each of such machine readable address indicators and or labels may be further provided with a decoder identifier such that when it is scanned by the user it is recognized by the controller 110 as a decoder address. Similarly, each master valve number indicator may similarly be provided with a station identifier such that when it is scanned it is recognized by the controller 110 as a master valve number.

In one embodiment, the sensor decoder information, such as information corresponding to the sensor decoders 130e and 130g of FIG. 1 is also printed onto the global portion 320. For example, in one embodiment, the sensor information includes the flow sensor decoder address, flow sensor number, description, sensor type, as well as the master valve associated with the particular sensor. In one embodiment, the sensor decoders are each provided with a barcode having printed thereon the address for the barcode. Upon being installed and associated with a particular sensor, the barcode is fixed on to the area designated for the flow sensor decoder address, for example as shown in FIG. 5A, the barcode 366 is fixed onto an area designated for the flower sensor decoder address, and can thereafter be scanned into the irrigation controller 110 using a barcode scanner. In one embodiment, the decoder address barcode comprises an indicator to identify the barcode as being a decoder address.

In one embodiment, a sensor number may be preprinted onto the global portion in the area designated for the sensor number, for example as shown in FIG. 5A, a barcode 364 is preprinted onto the area designated for the flow sensor number. In another embodiment, the barcode 364 may not be preprinted, and may instead be provided with the sensor and recorded onto the chart for example at the time the sensor is installed or associated with a decoder. In some embodiments, the barcode comprises an identifier which indicates to the system when scanned in that the barcode corresponds to a sensor number. In one embodiment, the system comprises a plurality of different types of sensors such as a flow sensor, weather sensor, etc. In another embodiment, the information regarding the sensor including the senor decoder address, and sensor number may be handwritten or otherwise recorded by a contractor or user.

Similar to programming the controller with station/decoder associations, at the time of installation, when decoders 130 are associated with a master valve or sensor, the user can remove the barcode provided with the decoder or decoder connection and place the barcode next to the station number for the specific station (for example, in column 312c), and or alternatively in the area designated for the specific master valve and/or sensor (described in more detail below). In some embodiments, after association of all of the decoders, the user is able to take the chart to the controller with an attached barcode reader, and read or scan decoder barcodes, and in embodiments where barcodes are provided for master valve or sensor numbers also scan the barcode for the master valve/sensor coupled to each decoder or sensor-decoder. In some embodiments, the barcodes may be scanned in any order. In one embodiment, once the user has scanned all of the barcodes, the addresses may be transferred to the front panel 112.

Thus, the user is able to automatically build an accurate list of the addresses (and associated master valves and sensors) for the front panel of all decoder devices after they are associated with stations, master valves and/or sensors. As a result, the user will successfully and efficiently program the controller. In addition, the user does not need to worry about errors in entering the addresses manually. Additionally, the user will be able to install the controller, such as controller 110 at any time during the process, in comparison to some controllers where the controller must be installed before the associations between the decoders and master valves and/or sensors must be predesignated before the in field installation (e.g., in field installation may include the process of burying the decoders in the field) or where the information must be manually recorded and kept for later programming of the controller. Furthermore, this will serve as an alternative to embodiments where the users have to manually enter the addresses of each decoder device and associated master valves and/or sensors.

While the exemplary embodiments throughout this specification refer to a barcode, it should be noted that in several different embodiments, different types of machine readable decoder address indicators and sensor number indicators may be used. For example, 3D barcodes, optically readable patterns other than barcodes, electromagnetically readable devices such RFID tags, etc., may be provided in lieu of the barcodes 364 and 366 illustrated in FIG. 5A and barcode 830 illustrated in FIG. 8. Each of such machine readable address labels may be further provided with a decoder identifier such that when it is scanned by the user it is recognized by the controller 110 as a decoder address. Similarly, each sensor number indicator may similarly be provided with a sensor identifier such that when it is scanned it is recognized by the controller 110 as a sensor number.

As illustrated in FIG. 5B, In one embodiment, a second side 334 of the global portion 320 further comprises information regarding the monthly seasonal adjustment percentage, and information regarding the irrigation programs such as programs A, B, C and D illustrated in FIG. 5B. For example, in one embodiment, for each program, the global portion comprises information including, program name, days to water, watering start times, seasonal and/or monthly seasonal adjustment, e.g. percentage to adjust regular watering, valve delays, maximum number of simultaneous stations, program water window start time, and program water window end time. In some embodiments, the indication of days to water are specified in a number of different ways including watering days indicated based on day of the week for the program, a particular day cycle, even or odd days, including odd 31.

While the global portion 320 is illustrated as being a two sided portion, comprised as a flap 330, it may take on different forms, and may further include a different section of the booklet. For example, in one embodiment, the global portion may be printed onto a back cover of the booklet, a front cover of the booklet, as a center fold out, etc. Furthermore, both the specific portion 310 and the global portion 320 may comprise other information not listed above and the information illustrated in the above figures are provided as examples of information that may be provided on the programming chart.

Returning to FIGS. 3A and 3B, in one embodiment, the specific portion 310 is bound into a booklet, having a front cover (not shown) and a back cover 340 made up of a thicker material than the pages of the booklet to provide the user, installing the units and filling in the information, support for writing onto the booklet specific portion pages. In one embodiment, the flap is designed such that it is a part of or extends from the back cover 340 as shown and described above with respect to FIGS. 5C and 5D. In one embodiment, the cover 340 is designed such that the upper portion of the back cover comprises the global portion 320. In another embodiment, the flap 330 may extend from the front cover of the programming chart 300.

Figure 6:
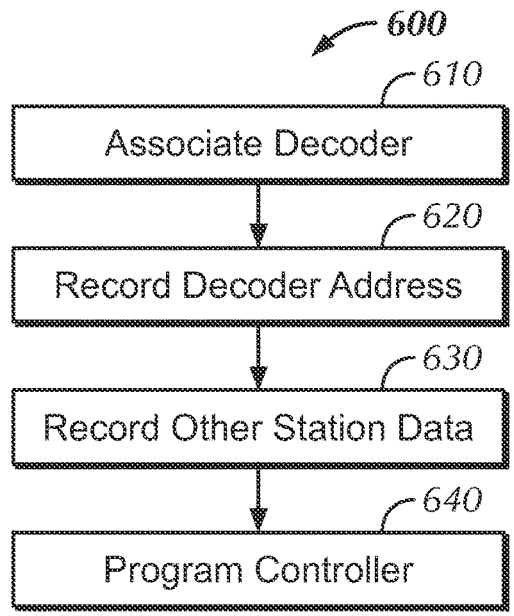
FIG. 6 illustrates a flow diagram of a process for use in programming an irrigation controller according to one or more embodiments of the present invention.

Referring next to FIG. 6, a process 600 for use in programming an irrigation controller is illustrated. In step 610, during installation, a user or contractor associates one or more decoders 130a-130n with stations/master valves 140 and/or sensors 160. In one embodiment, the user further couples or electrically connects the associated decoders and stations, master valves and sensors. In one embodiment, each decoder 130 is adapted to support up to 6 stations, master valves and/or sensors. In another embodiment, a decoder may support up to 4 stations, master valves and/or sensors. In yet another embodiment, one or more decoders 130 are adapted to support a single station, master valve or sensor. In yet a further embodiment, each decoder 130 is adapted to support up to n stations, master valves and/or sensors.

Next, in step 620, the decoder address associated with each station, master valve or sensor is recorded into the programming chart 300. In one embodiment, where the decoder is coupled to a specific station, the information is recorded next to the station number for the station in the specific portion 310. For example in one embodiment, the information is recorded onto column 312c in the specific row designated for the specific station. In another embodiment, wherein the decoder is connected to a master valve, the information is recorded onto the global portion 320, and specifically, according to some embodiments, on a first side 332, in the area designated for the specific master valve. In another embodiment, where the decoder is associated with a sensor, such as a weather and/or flow sensor, the information is recorded onto the global portion 320, and specifically, according to some embodiments, on a first side 332, in the area designated for the specific sensor. In one embodiment, the information being recorded is entered manually. In one embodiment, for example, the user will hand enter the decoder address being associated with each station, master valve and/or sensor. For example, the decoders 130a-n, have addresses printed thereon and the user will copy the address over to the chart by hand.

In an alternative embodiment, one or more of the decoders comprise barcodes for each specific connection, as shown for example in FIG. 8. For example, as illustrated in FIG. 8, in one embodiment, where decoders 130 supports up to 6 stations, master valves and/or sensors, the decoder is provided with 6 barcodes 830 each corresponding to the address for one of the connections. In such embodiments, the user records the information by removing the barcode associated with the connection associated with the station/station, master valve and/or sensor, and placing the barcode onto the chart as shown in FIG. 4 and FIG. 5B. According to several embodiments, placing the barcode onto the chart may comprise adhering the barcode, taping the barcode, etc. In one embodiment, the barcode is printed in self-adhesive material and is applied to the chart area.

Furthermore, during this step station numbers, master valve numbers and/or sensor numbers may also be recorded onto the programming chart. In one embodiment the numbers may be handwritten onto the chart or otherwise entered. In some embodiments, station, master valve and/or sensor number barcodes be provided with one or more stations/master valves 140 and sensors 160. The barcodes may be removed and recorded onto the chart for example at the time the sensor is installed, coupled and/or associated with a decoder.

While the exemplary embodiments throughout this specification refer to a barcode, it should be noted that in several different embodiments, different types of machine readable decoder address indicators may be used. For example, 3D barcodes, optically readable patterns other than barcodes, electromagnetically readable devices such RFID tags, etc., may be provided in lieu of the barcodes. Each of such machine readable address labels may be further provided with a decoder identifier such that when it is scanned by the user it is recognized by the controller 110 as a decoder address.

Next, in step 630, the user may record additional information pertaining to the specific station, master valve and or sensor into the specific portion 310 and/or global portion 320 of the chart. It should be noted that this step in process 600 is optional, and is not necessarily required for programming the irrigation controller. Instead, in some embodiments, the information recorded in this step serves the purpose of providing the user and or contractor with a visual representation of the overall system. In one embodiment, this step may be performed at any stage during the installation, programming and/or operation of the irrigation controller 110 and/or system 100.

Next, in step 640 after the coupling of decoders 130*a-n* in the field with stations, master valves and/or sensors 160 in the field, and recording of the information in the programming chart, the user will program the controller with the information available on the chart 300.

In some embodiments, after the association of decoders with stations, master valves and/or sensors and recording the decoder addresses and in some embodiments station numbers and other information, the user is able to take the chart to the controller with an attached barcode reader, and scan decoder barcodes, and in some embodiments also scan the barcode for the station/master valve/sensor coupled to each decoder or sensor-decoder. In some embodiments, the barcodes may be scanned in any order. In one embodiment, once the user has scanned all of the barcodes, the addresses may be transferred to the front panel 112.

Thus, the user is able to automatically build an accurate list of the addresses (and associated stations, etc.) for the front panel of all decoder devices after they are associated with stations, master valves and/or sensors. As a result, the user will successfully and efficiently program the controller. In addition, the user does not need to worry about errors in entering the addresses manually. Additionally, the user will be able to install the controller, such as controller 110 at any time during the process, in comparison to a typical controller where the controller may have to be installed before the in field installation of the decoders and the associations between the decoders and stations/master valves and/or sensors must be predesignated before the in field installation. Furthermore, this will serve as an alternative to embodiments where the users have to manually enter the addresses of each decoder device and associated stations/master valves and/or sensors.

It should be noted that in several different embodiments, different types of machine readable decoder address indicators and station number indicators may be used in lieu of the 2D barcodes illustrated and described with respect to exemplary embodiments. For example, 3D barcodes, optically readable patterns, electromagnetically readable devices such RFID tags, etc., may be provided in lieu of the barcodes. Each of such machine readable address indicator may be further provided with a decoder identifier such that when it is scanned by the user it is recognized by the controller 110 as a decoder address. Similarly, each station number indicator may similarly be provided with a station identifier such that when it is scanned it is recognized by the controller 110 as a station number.

Figure 7:
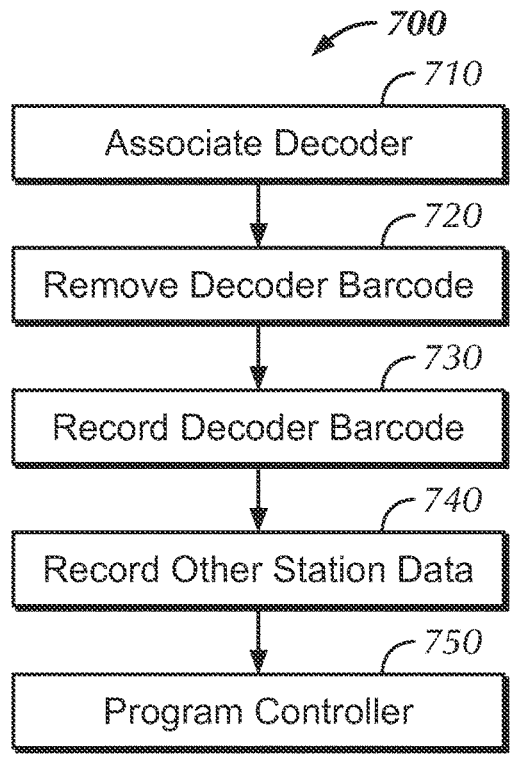
FIG. 7 illustrates a flow diagram of a process for use in programming an irrigation controller according to one or more embodiments of the present invention.

Referring next to FIG. 7, a more detailed process 700 for use in programming an irrigation controller is illustrated. In step 710, during installation, a user or contractor associates one or more decoders 130*a-*130*n* with stations/master valves 140 and/or sensors 160. In one embodiment, association of a decoder to a station/master valve refers to the user making decision to use a particular decoder to electrically connect to and control a particular station or master valve. In one embodiment, the user further couples or electrically connects the associated decoders and stations, master valves and sensors. In one embodiment, one or more decoders 130 are adapted to support up to 6 stations, master valves and/or sensors. In another embodiment, a decoder may support up to 4 stations, master valves and/or sensors. In another embodiment, one or more decoders 130 are adapted to support a single station.

Next, in step 720, the decoder barcode corresponding to the specific connection being associated with the station, master valve and/or sensor is removed, and in step 730 the decoder barcode associated with each station, master valve or sensor is recorded into the programming chart 300. In one embodiment, where the decoder is connected to a specific station, the information is recorded next to the station number for the station in the specific portion 310. For example in one embodiment, the information is recorded onto column 312*c* in the specific row designated for the specific station. In another embodiment, wherein the decoder is connected to a master valve, the information is recorded onto the global portion 320, in the area designated for the specific master valve. In another embodiment, where one or more of the decoder is associated with a sensor, such as a weather and/or flow sensor, the information is recorded onto the global portion 320, in the area designated for the specific sensor. For example, as illustrated in FIG. 8, in one embodiment, where the decoder 130 supports up to 6 stations, master valves and/or sensors, the decoder comprises 6 barcodes each corresponding to the address for one of the connections. In such embodiments, the user will remove the barcode associated with the connection associated with the station, master valve and/or sensor, and will place the barcode onto the chart. According to several embodiments, placing the barcode onto the chart may comprise adhering the barcode, taping the barcode, etc. In one embodiment, the barcode is printed in self-adhesive material and is applied to the chart area.

Furthermore, during this step station numbers, master valve numbers and/or sensor numbers may also be recorded onto the programming chart. In one embodiment the numbers may be handwritten onto the chart or otherwise entered. In some embodiments, station, master valve and/or sensor number barcodes be provided with one or more stations/master valves 140 and sensors 160. The barcodes may be removed and recorded onto the chart for example at the time the sensor is installed, coupled and/or associated with a decoder.

It should be noted that in several different embodiments, different types of machine readable decoder address indicators and station number indicators may be used. For example, 3D barcodes, optically readable patterns, electromagnetically readable devices such RFID tags, etc., may be provided in lieu of the 2D barcodes described with respect to exemplary embodiments and illustrated in several figures. Each machine readable address indicator may be further provided with a decoder identifier such that when it is scanned by the user it is recognized by the controller 110 as a decoder address. Similarly, each machine-readable station number indicator may similarly be provided with a station identifier such that when it is scanned it is recognized by the controller 110 as a station number.

Next, in step 740, the user may record additional information pertaining to the specific station, master valve and or sensor into the specific portion and/or global portion of the chart. It should be noted that this step in process 700 is optional, and is not necessarily required for programming the irrigation controller. Instead, in some embodiments, the information recorded in this step serves the purpose of providing the user and/or contractor with a visual representation of the overall system. In one embodiment, this step may be performed at any stage during the installation, programming and/or operation of the irrigation system 100 and controller 110.

Next, in step 750 after the association of the decoders 130*a-n* with stations/master valves 140 and/or sensors 160, and recording of the information in the programming chart, the user will program the controller with the information available on the chart 300.

In some embodiments, after association and/or coupling of all of the decoders and recording the information into the programming chart 300, the user is able to take the chart to the controller with an attached barcode reader, and scan decoder barcodes, and also scan the barcode for the station/master valve/sensor coupled to each decoder or sensor-decoder. In some embodiments, the barcodes may be scanned in any order. In one embodiment, once the user has scanned all of the barcodes, the addresses may be transferred to the front panel 112.

Thus, the user is able to automatically build an accurate list of the addresses (and associated stations, etc.) for the front panel of all decoder devices after they are associated with stations, master valves and/or sensors. As a result, the user will successfully and efficiently program the controller. In addition, the user does not need to worry about errors in entering the addresses manually. Additionally, the user will be able to install the controller, such as controller 110 at any time during the process, in comparison to some controllers where the controller may have to be installed before the in field installation of the decoders and the associations between the decoders and stations/master valves and/or sensors must be predesignated before the in field installation. Furthermore, this will serve as an alternative to embodiments where the users have to manually enter the addresses of each decoder device and associated stations/master valves and/or sensors.

Figure 9:
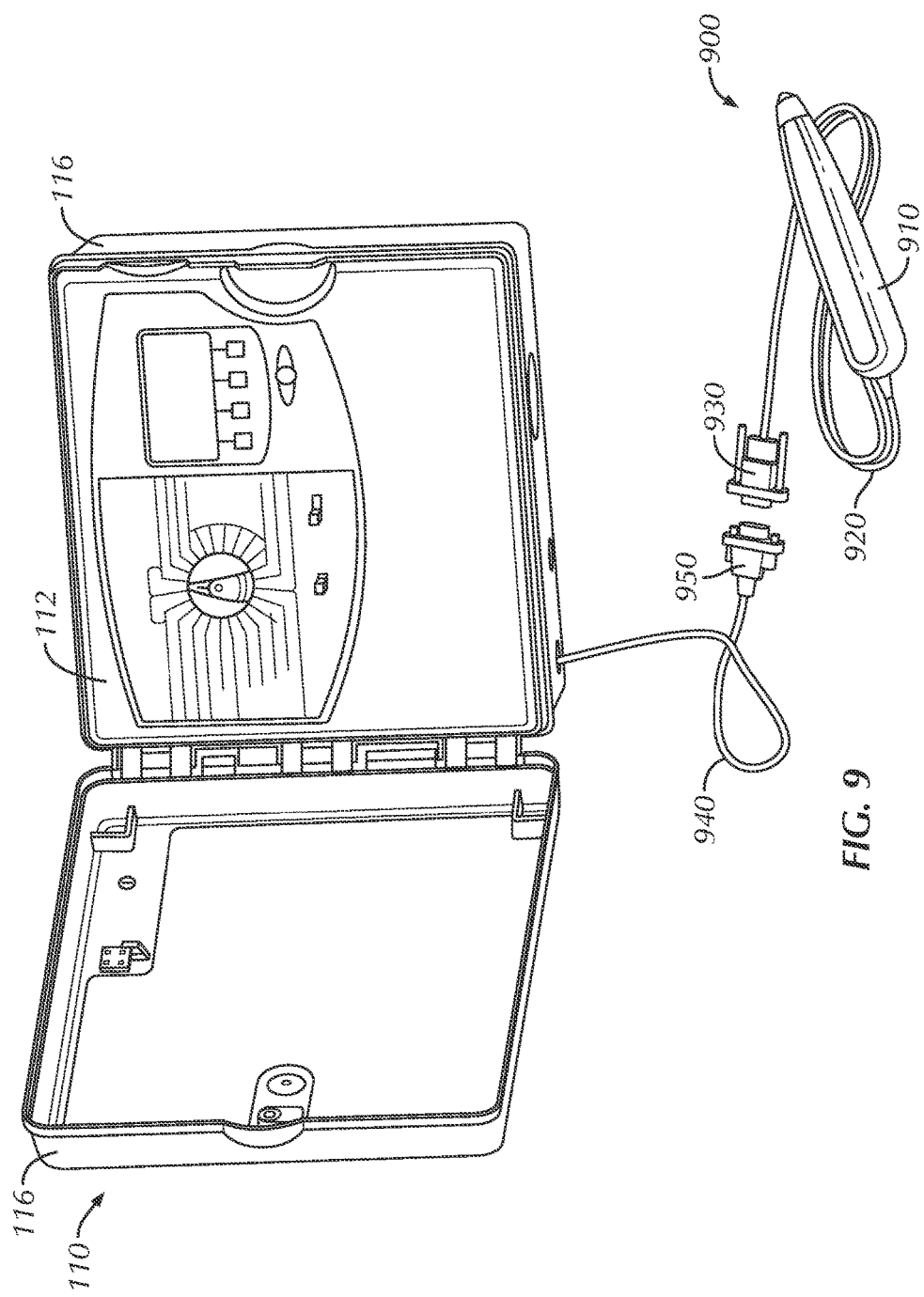
FIG. 9 illustrates a reader in the form of a barcode pen being attached to a decoder-based irrigation controller according to one or more embodiments of the present invention.

FIG. 9 illustrates an exemplary embodiment of a reader 1000 in the form of a barcode pen 900 coupled to the decoder-based controller 110.

In some embodiments barcode pen 900 may be used with the above decoder-based controller and programming chart according to several embodiments. In one embodiment the Unitech MS 100-2 barcode pen with 9 pin (female) serial connector may be used. In one embodiment, a barcode pen 900 comprises a pen 910 and a connector cable 920. In one embodiment, the connector cable comprises a serial connector 930 for connecting to the decoder-based controller. In some embodiments, the barcode pen 900 is used to carryout the methods described above for programming the irrigation controller using the programming chart 300.

In one embodiment the barcode pen 900 may be removably connected to the decoder-based controller 110 by means of an extension connector cable 940. In one embodiment, for example, the connector cable 940 may be plugged onto a connection jack, i.e. connector 1120 at the front panel or at the programming cartridge 134. For example, in one embodiment, the connector jack may be placed on the backside of the programming cartridge 134. In such embodiments, the connector cable 940 is then attached to the barcode pen 900.

In one embodiment for example, the connector cable 940 comprises serial connector 950, configured to receive the connector 930 of the scanner pen cable 920. For example, in one embodiment, the scanner pen cable 920 comprises a 9 pin female connector and the connector cable comprises a 9 pin male serial connector. In such embodiments, the serial connector 930 of the scanner pen cable 920 is attached to the connector cable serial connector 950. In such embodiments, by using a cable connector having a connection means that can be connected to the programming cartridge on one side, and a connector that may be attached to the barcode pen cable on the other side, any scanner pen may be purchased separate from the controller unit and used to perform one or more of the methods and processes described with respect to the present invention. In another embodiment, the barcode pen may be directly attachable to the controller without the use of a cable connector.

After connecting the barcode pen 900 to the decoder-based controller 110, in one embodiment, the barcode pen 900 may be setup by the user. In one embodiment, the barcode pen may be set up using one or more barcodes provided that can be scanned by the scanner pen 900 and will cause the controller to recognize the scanner pen 900 and perform the set up process. For example, in one embodiment, a programming guide for the controller may comprise a Barcode Scanning Pen set up Barcode for setting up the barcode scanning pen. In some embodiments, there may be a first set up barcode and a second set up barcode available for setting up the barcode scanning 900. In one embodiment, each of the first and second set up barcode may correspond to a set of instructions and or identifiers needed for setting up the barcode. For example, in one embodiment, the set up barcodes may comprise an identifier of the barcode reader, barcode type, etc. In one embodiment, the set up barcodes may comprise information needed to configure the reader to be able to read the types of labels or barcodes used on the decoders, sensors, stations, or otherwise used according to one or more embodiments. For example, in one embodiment, the reader is not originally configured to read the specific types of barcodes that are used with connection to the programming chart and/or the decoders and sensors. In one embodiment, the barcodes provide for configuration of the reader such that the configuration process may be completed without any human error.

In one embodiment, after the first and/or second set up barcode are scanned using the pen the barcode pen 900 is ready for use. In a further embodiment, after connecting and setting up the barcode pen 900, the decoder-based controller 110 comprises a setting for allowing the testing of the barcode pen. For example in one embodiment, the controller comprises a dial that is used to select a setting that allows testing the barcode pen 900 to ensure that the scanner pen has been set up correctly. In one embodiment, upon selecting the setting, a menu may be provided to the user where the user may be able to choose to test the barcode scanner. Next, in one embodiment, the user may be provided with instructions for steps to take to test the barcode pen. For example, in one embodiment, the user may be prompted to scan a station number from the programming chart 300. In one embodiment, the scanning of the station number will result in a message showing that the scanning was successful, which will indicate that the barcode pen 900 has been correctly connected and set up.

The barcode pen 900 may be used in different embodiments to provide the irrigation controller with the capability to read and process information provided on different items, labels, charts, decoders, etc. The above programming chart and method of using the programming chart to program the irrigation controller provides one example of how the barcode pen may be used, but does not limit the use of the barcode pen 900. In other embodiment, the barcode pen may be used in conjunction with alternative charts and or may be used independently to provide the irrigation controller with a wide array of information which may be presented in the form of a barcode and/or other optically or electromagnetically readable label. As described above, for example, in some embodiments, the barcode pen 900 may be used by the irrigation controller to set up different devices, and/or for testing devices, etc. In some embodiment, a barcode may be used to cause the program to enter a learning mode and or other modes of operation.

It should be understood that the barcode pen is used herein for illustration purposes, and that any smart label reader such as any optical or electromagnetic reader, RFID reader, barcode scanner or other reader capable of reading a 2D barcode, 3D barcode, RFID tag, optically readable tag, electromagnetically readable tag or similar indicator may be used in conjunction with the methods and apparatuses described with respect to the present invention.

While the invention herein disclosed has been described by means of specific embodiments, examples and applications thereof, numerous modifications and variations could be made thereto by those skilled in the art without departing from the scope of the invention set forth in the claims.

What is claimed is:

1. A decoder-based irrigation controller comprising:
   a microcontroller; and
   a first connector coupled to the microcontroller and configured to couple to a cabled barcode pen reader, wherein the cabled barcode pen reader comprises an optical reader configured to read an optically readable pattern, wherein the first connector is further configured to couple an input from the cabled barcode pen reader to the microcontroller;
   wherein the microcontroller is configured to interpret the input from the cabled barcode pen reader and perform an action at the decoder-based irrigation controller according to the input.

2. The decoder-based irrigation controller of claim 1 further comprising:
   a cartridge configured to be removably connected to the decoder-based irrigation controller, wherein the cartridge comprises the microcontroller and the first connector.

3. The decoder-based irrigation controller of claim 2 further comprising:
   a second connector coupled to a main microcontroller of the decoder-based irrigation controller, the second connector configured to allow connection of the cartridge to the main microcontroller.

4. The decoder-based irrigation controller of claim 1 further comprising:
   a cartridge configured to be removably coupled to the microcontroller, wherein the cartridge comprises the first connector.

5. The decoder-based irrigation controller of claim 1, wherein the input comprises one or both of a decoder address indicator corresponding to an address of a decoder unit and a station number indicator corresponding to a station number.

6. The decoder-based irrigation controller of claim 5, wherein the microcontroller is configured to:
   receive the address of the decoder unit and the station number, wherein the action comprises recording an association of the decoder unit with the first station.

7. The decoder-based irrigation controller of claim 5, wherein one or both of the decoder address indicator and the station number indicator comprise one of: a 2D barcode, a 3D barcode, and an optically readable pattern.

8. The decoder-based irrigation controller of claim 5, wherein the decoder address indicator and the station number indicator are read from a programming chart.

9. The decoder-based irrigation controller of claim 5, further comprising a user interface comprising a display coupled to the microcontroller,
   wherein the microcontroller is configured to cause the display of the address and station number indicator on the display.

10. The decoder-based irrigation controller of claim 5 further comprising a memory, wherein the memory is configured to store a listing including the address and the station number, addresses of a plurality of additional decoder units and corresponding station number indicators corresponding to station numbers.

11. The decoder-based irrigation controller of claim 1, wherein the cabled barcode pen reader comprises a barcode reader.

12. The decoder-based irrigation controller of claim 1, wherein the action comprises one or more of programming the decoder-based irrigation controller or causing the decoder-based irrigation controller to enter a different mode of operation.

13. The decoder-based irrigation controller of claim 1, wherein the optical reader is configured to read a printed pattern.

14. The decoder-based irrigation controller of claim 1, further comprising a decoder interface coupled to the microcontroller, the decoder interface configured to encode control data onto a power signal to be applied to a multi-wire control path to which each of a plurality of decoder units will be coupled.

15. The decoder-based irrigation controller of claim 1, wherein the optical reader is configured to read an optically readable pattern from one or more labels associated with a plurality of decoder units to be controlled by the decoder-based irrigation controller.

16. A method comprising:
receiving an input at a decoder-based irrigation controller from a cabled barcode pen reader that is detachably coupled to the first connector, wherein the cabled barcode pen reader comprises an optical reader configured to read an optically readable pattern;
interpreting the input from the cabled barcode pen reader; and
performing an action at the decoder-based irrigation controller according to the input.

17. The decoder-based irrigation controller of claim 1, further comprising a decoder interface coupled to the microcontroller, wherein the microcontroller is further configured to communicate irrigation commands through the decoder interface to the decoder interface to control at least one of a decoder or a sensor-decoder.

18. The decoder-based irrigation controller of claim 17, wherein the decoder interface is configured to encode data on a power signal delivered to the at least one of the decoder or the sensor-decoder.

19. The decoder-based irrigation controller of claim 1, wherein the optical reader is detachably coupled to the first connector at a second connector of a cable coupled to the optical reader.

20. The decoder-based irrigation controller of claim 1, wherein the optical reader configured to scan the optically readable pattern and generate the input based on the scanning of the optically readable pattern.

* * * * *

UNITED STATES PATENT AND TRADEMARK OFFICE
CERTIFICATE OF CORRECTION

PATENT NO. : 9,980,442 B2
APPLICATION NO. : 14/521277
DATED : May 29, 2018
INVENTOR(S) : Jonathan I. Marsters et al.

Page 1 of 1

It is certified that error appears in the above-identified patent and that said Letters Patent is hereby corrected as shown below:

In the Specification

Column 1, Line 6; delete "2010 ," and insert --2010,-- therefor.

In the Claims

Claim 1, Column 19, Line 58; after "configured to", insert --detachably--.

Claim 16, Column 21, Line 5; after "at a", insert --first connector of a--.

Claim 20, Column 21, Line 29; after "reader", insert --is--.

Signed and Sealed this
Fourteenth Day of August, 2018

Andrei Iancu
*Director of the United States Patent and Trademark Office*